United States Patent [19]
Morgovsky et al.

[11] Patent Number: 4,915,123
[45] Date of Patent: Apr. 10, 1990

[54] APPARATUS FOR PREPARING GAS MIXTURES FROM CONSTITUENTS TAKEN IN A GIVEN PROPORTION

[76] Inventors: Grigory A. Morgovsky, ulitsa Dneprovskava naberezhnava, 9a, kv. 390, Kiev; Evgeny P. Pistun, ulitsa Kulparkovskava I4I, kv. I84; Zenovy N. Tepljukh, ulitsa Ordzhonikidze I, kv. I9, both of Lvov; Yakov L. Sankin, Brest-Litovsky prospekt, I64a, kv. I4, Kiev, all of U.S.S.R.

[21] Appl. No.: 189,471

[22] Filed: May 2, 1988

[51] Int. Cl.[4] .............................................. G05D 11/03
[52] U.S. Cl. ...................................... 137/599; 137/606
[58] Field of Search ................. 137/601, 607, 599, 88, 137/606

[56] References Cited

U.S. PATENT DOCUMENTS

| | | | |
|---|---|---|---|
| 3,856,033 | 12/1974 | Strain et al. . | |
| 4,191,215 | 3/1980 | Gonner | 137/599 X |
| 4,420,009 | 12/1983 | Sharp | 137/599 X |
| 4,467,834 | 8/1984 | Rochat | 137/607 |
| 4,605,034 | 8/1986 | Urshida | 137/88 |
| 4,658,988 | 4/1987 | Hassell | 137/607 X |

FOREIGN PATENT DOCUMENTS

| | | |
|---|---|---|
| 2123961 | 5/1971 | Fed. Rep. of Germany . |
| 2707122 | 4/1982 | Fed. Rep. of Germany . |
| 643848 | 2/1978 | U.S.S.R. . |

*Primary Examiner*—Alan Cohen
*Attorney, Agent, or Firm*—Lilling & Greenspan

[57] ABSTRACT

An apparatus for preparing gas mixtures from constituents taken in a given proportion which incorporates sources of gas mixture constituents connected to pressure-reducing valves and to a device for stabilizing absolute pressures of the gas mixture constituents an outlet of which communicates with a device for setting a proportion between the gas mixture constituents consisting of a distributor which is series-connected to at least two—depending on the number of the gas mixture constituents—sets of capillary tubes featuring all the same friction head. The device for setting the proportion between the gas mixture constituents is connected to a main mixer of the gas mixture components an outlet of which communicates with a controller of absolute pressure of the gas mixture.

7 Claims, 2 Drawing Sheets

APPARATUS FOR PREPARING GAS MIXTURES FROM CONSTITUENTS TAKEN IN A GIVEN PROPORTION

BACKGROUND OF THE INVENTION

1. Field of the Invention

The present invention relates to instrument technology and has specific reference to apparatus for preparing gas mixtures from constituents taken in a given proportion.

The invention will find application in gas analysing engineering for the preparation of calibrating gas mixtures and as a synthesizer of the gas mixtures used in life-support systems, medical and biological research, in epitaxial-growth and evaporation processes.

2. Description of the Prior Art

Calibration gas mixtures are in wide-spread use, being supplied in high-pressure cylinders (up to 14 Mpa) to customers. They are prepared by introducing the constituents one after another, whereby the pressure of each succeeding component must be higher than that of the preceding one. The composition of the gas mixtures produced in this way lacks reliability and must be tested with the aid of reference gas analysers before using such mixtures for calibration purposes. The existing practice of preparing gas mixtures in high-pressure cylinders calls for setting up a complicated system of storing, shipping and servicing the cylinders in vast numbers at high cost. Not excluded is a deterioration of the composition of the gas mixture in this case or its ineffective utilization. Precisely reproducing a given composition of a mixture is a problem.

As a result the recourse is made to continuous dynamic installations capable of producing gas mixtures of given composition under low pressure in situ.

Widely known is an apparatus for the preparation of a gas mixture from constituents used in a given proportion which is employed mainly in equipment for gas analysis of blood (DE; C; 2,123, 691). It has two flow paths each of which incorporates a source of gas mixture constituent, a pressure-reducing valve, two filters and a gas pressure controller which are all connected in series and linked to a pair of orifice plates connected in parallel at the downstream sides. The outflow from an orifice plate in the first flow path is connected to the outflow from an orifice plate in the second flow path and the outflow from the other orifice plate in the first flow path is connected to the outflow from the other orifice plate in the second flow path. The orifice plates are contained in a constant-temperature container, and the flow areas of the orifices have a ratio of 17:17:2:1. The outflow of each gas mixture constituent from its source enters the pressure-reducing valve for reducing the pressure to a specified level before reaching the two filters, designed to separate moisture and sediments, and the gas pressure controller which accurately maintains the gas pressure at a specified value. The outflow from the pressure controllers is passed through the two orifice plates in each flow path so that finally there are produced two streams of gas mixture the proportion between the constituents of which is determined by the diameters of the flow areas of the orifices.

The known apparatus is incapable of producing gas mixtures of precisely specified composition. The proportion between the gas mixture constituents is a function of the flow rates of these constituents through the orifices which cannot be accurately determined due to lack of accurate flowmeters, inaccurate formulae for calculating the flow rates through the orifices and the effect of non-informative variables (temperature, barometric pressure) which must be taken into account during these calculations. Therefore, the known apparatus must be tested for performance not with the aid of gas flowmeters but using reference gas analysers. An unavoidable difference between the pressure at the upstream sides of the orifice plates and the barometric pressure influences the proportioning of the gas mixture constituents so that the known apparatus cannot guarantee an exact reproduction of a given composition of the gas mixture.

Also well-known is an apparatus for producing a gas mixture from constituents taken in a given proportion which is used in calibrating gas analysers (US; A; 3,856,033). The known apparatus features several feed lines each consisting of series-connected sources of gas mixture constituents, pressure-reducing valves, stop valves, a regulating valve connected to the outlets from all stop valves, a gas mixer the inlets of which are connected to the regulating valve and to the sources of gas mixture constituents, a compressor the inlet of which is connected to the gas mixer, a gas analyser the inlet of which is connected to the high-pressure feed line downstream of the compressor and a means of sensing deviations in the value of the proportion between the gas mixture constituents from a set value which serves to control the operation of the regulating valve.

A flow of every gas mixture constituent enters the gas mixer, and the composition of the mixture formed there is monitored by the gas analyser. Any deviation from a given composition is converted into an analogue signal which controls the operation of the regulating valve. The proportioning of the gas mixture constintuents is under a continuous control in the apparatus and is effected by changing the flow rates of the constituents. The apparatus thus employs the feed-back principle but cannot ensure good accuracy of proportioning the gas mixture constituents owing to errors which occur during the operation of automatic gas analysers, in converting gas analyser signals and controlling the flow rates of the constituents.

Further known is an apparatus for controlling the composition of gas mixtutes (SU; A; 643,848) incorporating sources of gas mixture constituents to the outlets of which there are connected pressure-reducing valves and a means of setting a proportion between the gas mixture constituents which consists of a distributor and two sets of capillary tubes series-connected to the distributor. The number of the capillary tubes is decided by the number of the gas mixture constituents, and the friction heads of the tubes relate as 1:2:2:5. The known apparatus is provided with a mixer of the gas mixture constituents in the form of a fluidic element with three series-connected loop chambers. The midmost thereof is filled with a nozzle connected to a pressure-reducing valve, and facing the nozzle is a confuser of an ejector with a mixing passage connected to a header the outlet of which is the outlet from the apparatus. The inlets into the extreme loop chambers of the fluidic element are linked to the sources of gas mixture constituents by way of the capillary tubes and the distributor.

In the known apparatus the proportioning of the gas mixture constituents is controlled by their flow rates through the capillary tubes and ejector. But since these flow rates can be neither calculated nor directly measured with a good degree of precision, the proportioning of the constituents also lacks accuracy. Instability of ejector performance and the effect of noniformative variables (barometric pressure, temperature, work load) cause time-dependent variations of the flow rate values, both absolute and relative to each other. No accurate determination of the relation between the friction heads of the capillary tubes is possible due to a non-linear character of the value, lack of adequate equipment and metrological difficulties.

Summary of the Invention

It is an object of the invention to improve the accuracy achievable in preparing a gas mixture from constituents taken in a given proportion.

This object is materialized by an apparatus for preparing gas mixtures from constituents taken in a given proportion incorporating sources of gas mixture constituents. A pressure-reducing valves is connected to outlets from the sources of gas mixture constituents. Means of setting the proportion between the gas mixture constituents consist of a distributor and at least two, depending on the number of the gas mixture constituents, sets of capillary tubes and connected with its inlet to the sources of gas mixture constituents. A main mixer of the gas mixture constituents connected to an outlet from the means of setting the proportion between the gas mixture constituents. According to the invention the capillary tubes of the means of setting the proportion between the gas mixture constituents feature all the same friction head, whereby a means of stabilizing absolute pressures of the gas mixture constituents is provided on the lines linking the sources of gas mixture constituents to the means of setting the proportion between the gas mixture constituents and a controller of absolute pressure of the gas mixture is provided at an outlet from the main mixer of the gas mixture constituents.

For a further increase in the accuracy of preparing a gas mixture from constituents taken a given proportion it is expedient to use the capillary tubes in the means of setting the proportion between the gas mixture constituents the dimensions of which are determined by the relationship $$l/d^2 = P/16\mu\sqrt{mT_n\rho/2P_nT} \qquad (1)$$

where

- d is the inside diameter of the capillary tubes;
- l is the length of the capillaray tubes;
- $\rho$ is the density of the gas under normal conditions ($T_n$=273.15 K; $P_n$=101325 Pa);
- $\mu$ is the viscosity of the gas at a temperature $T_n$;
- P is the absolute pressure of the gas outflow from the capillary tubes;
- m is a factor taking the effect of the outflow from the capillary tubes into account.

For a still further increase in the accuracy of preparing gas mixtures from constituents taken in a given proportion it is expedient to incorporate orifice plates and an additional mix of the gas mixture constituents into the means of stabilizing the absolute pressures of the gas mixtures constituents, whereby each of the orifice plates communicates with a source of gas mixture constituents through its inlet and the additional mixer of the gas mixture constituents communicates through its inlets with the orifice plates and with an inlet into the means of setting the proportion between the gas mixture constituents and also communicates through its outlet with the controller of the absolute pressure of the gas mixture.

It is also expedient to incorporate controllers of absolute pressure of the gas mixture—the number of the controllers equalling the number of the gas mixture constituents—and zero-indicators of pressure differential of the gas mixture constituents into the means of stabilizing the absolute pressures of the gas mixture constituents, whereby each of the controllers is connected to a source of gas mixture constituent with its inlet and to the means of setting the proportion between the gas mixture constituents, and the zero-indicators are connected to each pair of the controllers of absolute pressure of the gas mixture at outlets therefrom.

It is further expedient to provide the main and additional mixers of the gas mixture constituents in the form of headers the inlet passages which make an angle less than 90° with each other, whereby not only the accuracy of proportioning the gas mixture constituents is improved but a changeover from one gas mixture to another is speeded up.

The disclosed invention is conducive to an unprecedented accuracy of proportioning the constituents of a gas mixtue without resorting to calibration of the apparatus by means of a gas analyser. It also permits a speedy changeover from one gas mixture to another in the course of such a mixture.

Brief Description of the Drawings

Preferred embodiments of the present invention will be better understood upon consideration of the following detailed description of an apparatus for preparing gas mixtures from constituents taken in a given proportion which must be read with reference to the accompanying drawings wherein.

Description of the Preferred Embodiment

Figure 1:
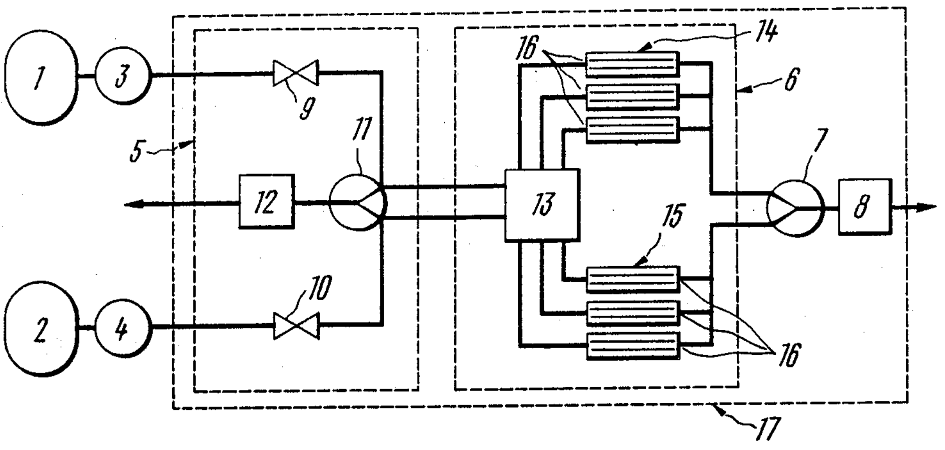
FIG. 1 is a schematic diagram of the apparatus for preparing gas mixtures from constituents taken in a given proportion according to the invention.

Referring to FIG. 1, the apparatus for preparing gas mixtures from constituents taken in a given proportion incorporates two sources 1, 2 of the gas mixture constituents, the mixture being a binary one; pressure-reducing valves 3, 4 connected to outlets from the sources 1, 2; a unit 5 for stabilizing the absolute pressures of the gas mixture constituents connected with its inlet to the outlets from the pressure-reducing valves 3, 4; a unit 6 of setting the proportion between the gas mixture constituents connected with its inlet to the outlet from the unit 5; a main mixer 7 of the gas mixture constituents connected with its inlet to the outlet from the unit 6; and a controller 8 of the absolute pressure of the gas mixture connected to the outlet from the main mixer 7.

The unit 5 of stabilizing the absolute pressures of the gas mixture constituents incorporates orifice plates 9, 10 connected to the outlets from the pressure-reducing valves 3, 4, respectively; an additional mixer 11 of the gas mixture constituents connected with its inlets to the outlets from the orifice plates 9, 10; and a controller 12 of the absolute pressure of the gas mixture which is connected to the outlet from the mixer 11 of the gas mixture constituents to effect stabilization of the gas pressure upstream of a final control element. The outlets from the orifice plates 9, 10 are the outlet from the unit 5 of stabilizing the absolute pressure of the gas mixture constituents.

The unit 6 of setting the proportion between the gas mixture constituents incorporates a distributor 13 the inlet of which connects to the outlets from the orifice plates 9, 10 and to the inlet into the mixer 11 of the gas mixture constituents—a component of the unit 5. The outlet from the distributor 13 is connected to two sets 14, 15 of capillary tubes 16 the outlets of which are interconnected and linked to a corresponding inlet channel of the mixer 7 of the gas mixture constituents.

Each of the sets 14, 15 of the capillary tubes 16 serves to set a proportion of an individual gas mixture constituent, and therefore, there are as many sets 14, 15 as there are constituents in the gas mixture. The number of capillary tubes in each set 14, 15 (three in the case under consideration) is determined by the number of gas mixtures of different compositions which can be obtained at the outlet from the apparatus. The apparatus under consideration is capable of producing binary gas mixtures the constituents of which can be present each in seven different proportions: 0.25; 0.3333; 0.4; 0.5; 0.6; 0.6666; 0.75. Apart from that a pure constituent of the gas mixture is obtainable at the outlet from the apparatus.

The capillary tubes 13 comprising the set 14 and those in the set 15 feature all the same friction head or gas dynamic resistance values and a linear flow rate owing to the fact that the dimensions of the capillary tubes are determined by the relatinship $$1/d^2 = P/16\mu\sqrt{mT_n\rho 2P_nT} \qquad (1)$$

where d is the inside diameter of every capillary tube 16;

1 is the length of every capillary tube 16;

$\rho$ is the density of the gas under normal conditions ($T_n=273.15$ K; $P_n=101325$ Pa);

$\mu$ is the viscosity of the gas at a temperature $T_n$;

P is the absolute pressure of the gas outflow from the capillary tubes 16;

m is a factor taking the effect of the outflow from the capillary tubes 16 into account.

Flowing through each set 14 and 15 of the capillary tubes 16 is a certain gas only. Therefore, the capillary tubes comprising a set (either at 14 or at 15) have all the same inside diameter and length but the dimensions of the capillary tubes 16 in one set differ from those of their counterparts in the other set. The material of the capillary tubes 16 is mainly glass or stainless steel.

The distributor 13 of the unit 6 of setting the proportion between the gas mixture constituents is designed to put on-stream a certain number of capillary tubes 16 in each set depending on the given proportion between the gas mixture constituents. A most simple distributor 13 includes stop valves (not shown) provided at the inlets of all capillary tubes 16 and operated manually, electrically or pneumatically. The distributor 13 automatically admits gas into a requisite number of the capillary tubes 16 in each of the sets 14 and 15 in response to a signal from the consumer.

The main and additional mixers 7 and 11, respectively, of the gas mixture constituents are provided in the form of headers the inlet passages which make an angle less than 90° with each other.

All elements of the apparatus except the sources 1, 2 of gas-mixture constituents and the pressure-reducing valves 3, 4 are contained in a constant-temperature cabinet 17.

Figure 2:
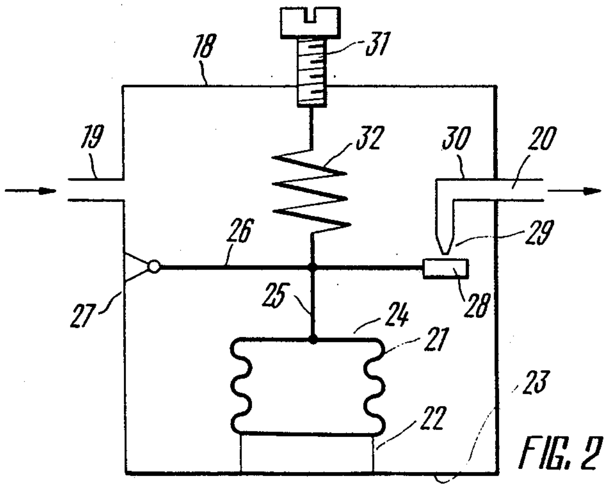
FIG. 2 is a schematic diagram of a controller of the absolute pressure of the gas mixture according to the invention.

Referring to FIG. 2, the controllers 8 and 12 of the absolute pressure of the gas mixture serve to stabilize the gas pressure up-stream of their respective final control elements. Each of the controllers 8 and 12 consists of an air-tight chamber 18 with an inlet connection 19 and an outlet connection 20 wherein there is a sensing element of the controllers 8, 12 of the pressure of the gas mixture, the sensing element being in the form of a vacuum-type bellows 21. An end plate 22 of the belows 21 is attached to a wall 23 of the chamber 18 and the other end plate 24 is linked through a tierod 25 to a lever 26 hinged with an end to a wall 27 of the chamber 18. The opposite end of the lever 26 is fitted with a flapper 28 arranged to close a nozzle 29 connecting to the outlet connection 20 via a tube 30. Each of the controllers 8 and 12 is set for a pressure it is designed to stabilize with the aid of an adjusting screw 31 which is linked to the lever 26 through a spring 32. The pair consisting of the nozzle 29 and the flapper 28 is the final control element of the controllers 8 and 12.

Figure 3:
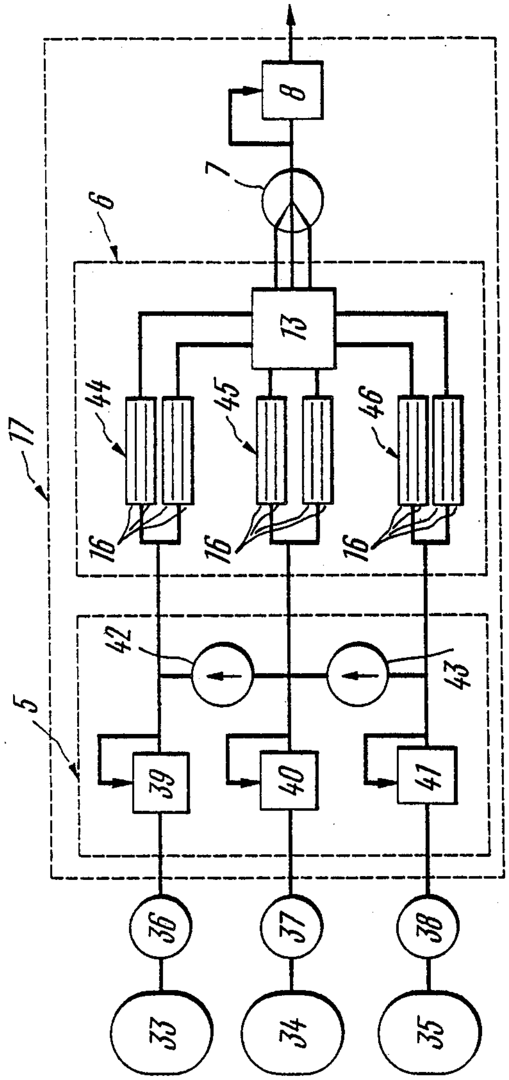
FIG. 3 is a schematic diagram of the apparatus according to the invention, in another embodiment.

In another embodiment of the invention, the apparatus for preparing gas mixture from constituents taken in a given proportion can handle three constituents. Accordingly, this apparatus (FIG. 3) incorporates sources 33, 34 and 35 of gas mixture constituents; pressure-reducing valves 36, 37, 38 connected to outlets from the sources 33, 34, 35; a unit 5 for stabilizing the absolute pressure of the gas mixture constituents connected with its inlet to the pressure-reducing valves 36, 37, 38; a unit 6 of setting a proportion between the gas mixture constituents connected with its inlet to the outlet from the unit 5; a main mixer 7 of the gas mixture constituents connected to the outlet from the unit 6; and a controller 8 of the absolute pressure of the gas mixture which is connected to the outlet from the unit 6 and serves to stabilize the pressure upstream of its final control element.

In this embodiment of the invention the unit 5 of stabilizing the absolute pressure of the gas mixture constituents incorporates controllers 39, 40, 41 of the absolute pressure of the gas mixture and zero-indicators 42, 43 of the pressure differential of the gas mixture constituents, whereby the pressure controllers 39, 40, 41 serving to stabilize the pressure downstream of their final control element are connected to the outlets from the pressure-reducing valves 36, 37, 38 with their inlets and to corresponding inlets into the unit 6 of setting the proportion between the gas mixture constituents with their outlets and the zero-indicators 42, 43 are connected to the outlets from each pair of the pressure controller 39, 40 and 40, 41, respectively. For the controllers 39, 40, 41 of the absolute pressure of the gas mixture, which are provided in a number equalling the number of gas mixture constituents and serve to stabilize the gas pressure downstream of their final control element, the connection 19 (FIG. 2) is the outlet, the connection 20 is the inlet and the nozzle 29 is located at the other side of the flapper 28.

The unit 6 (FIG. 3) of setting the proportion between the gas mixture constituents incorporates three sets 44, 45, 46 of capillary tubes 16 the outlets of which are connected to a distributor 13 the outlet of which is the outlet of the unit 6 of setting the proportion between the gas mixture constituents. The inlets of the capillary tubes 16 in each of the sets 44, 45, 46 are connected to the outlets from the controllers 39, 40, 41 of the absolute pressure of the gas mixture. Each of the sets 44, 45, 46 consists of two capillary tubes 16, and this arrangement of unit 6 of setting the proportion between the gas mixture constituents enables the apparatus to synthesize sixteen gas mixtures from the constituents taken in specified proportions.

Apparatus for preparing gas mixtures from constituents taken in a given proportion operates as follows.

The flows of the gas mixture constituents originating in the sources 1, 2 (FIG. 1) enter the pressure-reducing valves 3, 4 which reduce the gas pressures to an appropriate level and smooth down a possbile pressure differential to some extent. Accurate stabilization of the absolute pressure of the gas at the inlets into the capillary tubes is effected by virtue of the controller 12 of the absolute pressure of the gas mixture and the mixer 11 of the gas mixture constituents which change the pressure differential at the orifice plates 9 and 10. The flow of every gas mixture constituent leaving the pressure-reducing valves 3, 4 passes through the orifice plates 9, 10 and enters the capillary tubes 16 by way of the stop valves of the distributor 13 which are set open. Some of the flow of every gas mixture constituent is tapped downstream of the orifice plates 9, 10 and diverted into the auxiliary mixer 11 of the gas mixture constituents. The outflow of the gas mixture from the mixer 11 is fed into the controller 12 of the absolute pressure of the gas mixture which stabilizes the gas pressure upstream of its final control element. Any change in the absolute pressure of gas mixture constituents brings about a change in the pressure inside the chamber 18 (FIG. 2) of the controller 8 of the absolute pressure of the gas mixture. The bellows 21 compresses or expands so that the flapper 28 actuated by the tierod 25 and the lever 26 changes its position with respect to the nozzle 29, increasing or decreasing the flow rate of the gas mixture at the outlet from the apparatus for a period required to restore the absolute gas pressure set by the adjusting screw 31.

The distributor 13 of the unit 6 puts on stream in every of the sets 14, 15 a certain number of capillary tubes 16 depending on the given proportion between the gas mixture constituents. The proportion settings obtainable in this way are accurate owing to the fact that all the linear capillary tubes 16 display the same friction head and operate under identical conditions. In particular, identical are the factors influencing the gas flow rates through the capillary tubes such as the absolute gas pressures at the inlets into and outlets from the capillary tubes 16 and the temperatures of the gas mixture constituents. The composition of a gas mixture produced is determined by the relationship between the number of the capillary tubes 16 put on stream in the sets 14, 15.

An equality of the friction heads of the capillary tubes 16 for all gas mixture constituents can be established, for example, with the aid of a bridge circuit irrespectively of the absolute friction heads of the capillary tubes 16, using any known technique (Regelungstechnik, DE, Berlin, No. 3, 1967; V. Ferner "Grundlegende Aspekte der Niederdruckpneumatik", Teil I, pp. 97, 103–104). On selecting the capillary tubes 16 of the unit 6 in this way, a certain number of the capillary tubes 16 is alloted for each gas mixture constituent to obtain a requisite proportion therebetween. Since an accurate proportioning of the mixture constituents depends on the accuracy of determining the equality of the friction heads of the capillary tubes 16, there is a prospect of increasing the accuracy of setting the proportion between the gas mixture constituents and abandon the practice of verifying the apparatus for performance in terms of proportioning by resorting to reference gas analysers. The disclosed apparatus renders superfluous measurements of exact dimensions of the capillary tubes 16, flow rates of the gas mixture constituents, variables influencing the behaviour of the constituents-e.g. such as the viscosity and density of gas which can be ascertained accurately to within 0.1–1% on the best side-and actual proportioning the gas mixture constituents determinable by means of reference gas mixers with an accuracy which also leaves much to be desired.

The fact that the friction head of the capillary tubes 16 is ascertained by taking differential pressure measurements at their ends with a bridge circuit incorporating orifices ensures an equality of the friction heads of the capillary tubes so selected which is accurate to better than 0.01%.

The fact that the dimensions of the capillary tubes 16 used in the means 6 of setting the proportion between the gas mixture constituents are determined by the relationship $$l/d^2 = P/16\mu\sqrt{mT_n\rho/2P_nT} \quad (1)$$

where d is the inside diameter of every capillary tube 16; l is the length of every capillary tube 16; $\rho$ is the density of the gas under normal conditions ($T_n = 273.15$ K; $P_n = 101325$ Pa); $\mu$ is the viscosity of the gas at a temperature $T_n$; P is the absolute pressure of the gas outflow from the capillary tubes 16; m is a factor taking the effect of the outflow from the capillary tubes 16 into account, makes for a linear rate of flow of the gas through the capillary tubes 16, i.e. for a linear relationship between the friction head of the capillary tubes 16 and the absolute pressure of the gas at their ends. This requirement, if met, provides for an invariable proportioning of the gas mixture constituents which is not affected by changes of the absolute gas pressure at the ends of the capillary tubes 16. Any deviation of the absolute gas pressure at the ends of the capillary tubes 16 from an optimum value brings about a proportional change in the friction head of the capillary tubes and, as a result, a change in the linear flow rates of the gas mixture constituents.

Thus, it should be evident that slight changes in the pressure at the ends of the capillary tubes do not lead to changes of the proportion between the gas mixture constituents, this fact being attributed to the equality of the friction heads of the capillary tubes 16 and to the linearity of their flow rates. It follows from relationship (1) that linear flow rates can be set up in the capillary tubes 16 by stabilizing the absolute gas pressure at the outlets from the capillary tubes 16.

The absolute pressure stabilization of the gas at the ends of the capillary tubes 16 enhances the accuracy of gas mixture synthesis. Catering for the stabilization is the equality of the friction heads of the capillary tubes 16 on the one hand-these heads being a function of the absolute gas pressure-and the linear nature of the gas flow rates through the capillary tubes 16 of the apparatus on the other hand. As a result, not only constant flow rates of the gas mixture are set up (flow rate variations being decided by the error slipping into the operation of the means 5 of stabilizing the absolute pressure of the gas mixture constituents) but the proportion between the gas mixture constituents is constant.

The outflow of the gas mixture constituents from the capillary tubes 16 enters the main mixer 7 where a gas mixture is formed which is fed into the chamber 18 of the controller 8 of the absolute pressure of the gas mixture for the stabilization of the gas pressure upstream of its final control element and an additional intermixing of the gas to take place. The outflow of the gas mixture containing the constituents in the given proportion is fed to the customer on leaving the controller 8 of the absolute pressure of the gas mixture.

The apparatus in another embodiment of the invention operates essentially on the same lines.

An outflow of each gas mixture constituent from the sources 33, 34, 35 (FIG. 3) and the pressure-reducing valves 36, 37, 38 enters the chamber 18 (FIG. 2) of the controllers 39, 40, 41 (FIG. 3) of the absolute pressure of the gas mixture, whose function is to stabilize the gas pressure downstream of its final control element, i.e. at the outlets from the controllers 39, 40, 41 of the absolute pressure of the gas mixture. Before applying the gas flow to the inlets into the capillary tubes 16, the zero-indicators 42, 43 find out whether a pressure differential exists between the outflows from the pressure controllers 39, 40, 41. If one exists, use is made of the corresponding adjusting screw 31 (FIG. 2) of a corresponding pressure controller 39, 40, 41 by means of which the pressures of all gas mixture constituents can be equalized. Identical friction heads of the capillary tubes 16 in combination with identical operating conditions set up for these tubes owing to the absolute gas pressures being equalized and stabilized at their ends ensure high accuracy of setting the proportion between the gas mixture constituents.

EXAMPLE

An apparatus designed to produce mixtures of nitrogen and carbon dioxide in given proportions was provided with two sets of capillary tubes featuring all the same friction head. The capillary tubes through which nitrogen passed had an inside diameter $d=0.24$ mm and a length $1=74$ mm. The dimensions of their counterparts for the carbon dioxide were $d=0.21$ mm; $1=88$ mm.

The disclosed apparatus for preparing gas mixtures from constituents taken in a given proportion ensures high accuracy of a continuous gas mixture synthesis. The apparatus is adapted to produce gas mixtures in situ in remote localities and those accessible with difficulty.

What is claimed is:

1. An apparatus for preparing gas mixtures from constituents taken in a given proportion comprising sources of gas mixture constituents, each having an outlet;

pressure-reducing valves connected to said outlets from said sources of gas mixture constituents;

stabilizing means for stabilizing the absolute pressure of the gas constituents and having inlets and outlets, each of said inlets of said stabilizing means being connected to an associated one of said pressure-reducing valves;

proportion setting means for setting the proportion between the gas mixture constituents and having inlets and outlets, the inlets of said proportion setting means being connected to associated outlets of said stabilizing means, said proportion setting means having a distributor having inlets and outlets and at least two, depending on the number of the gas mixture constituents, sets of capillary tubes connected to said outlets of said distributor and said inlets of said distributor forming said inlets of said proportion setting means;

a main mixer of the gas mixture constituents, having inlets and an outlet, the inlets of said main mixer being connected to the outlets of said proportion setting means; and a controller of the absolute pressure of the gas mixture connected to the outlet of said main mixer.

2. An apparatus as claimed in claim 1, wherein said stabilizing means incorporates orifice plates having inlets and outlets, the inlets of said orifice plates being connected to said pressure-reducing valves;

an additional mixer of the gas mixture constituents having inlets and an outlet, the inlets of said additional mixer being connected to the outlets from said orfice plates and to the inlets of said proportion setting means; and a further controller of the absolute pressure of the gas mixture connected to the outlet from said additional mixer.

3. An apparatus as claimed in claim 1, wherein the stabilizing means incorporates further controllers of the absolute pressure of the gas mixture the number of which is determined by the number of the gas mixture constituents and each of which has an inlet and an outlet, each further controller having its inlet connected to an associated pressure-reducing valve and its outlet connected to an associated inlet of said proportion setting means; and zero indicators of pressure differential of the gas mixture constituents which are connected between outlets of associated pairs of said further controllers.

4. An apparatus as claimed in claim 1, wherein said main mixer is provided in the form of a header having inlet passages; which make an angle less than 90° with each other.

5. An apparatus as claimed in claim 2, wherein said main and additional mixers are provided in the form of headers having inlet passages which make an angle less than 90° with each other.

6. An apparatus as claimed in claim 3, wherein said main mixer is provided in the form of a header having inlet passages of said header making an angle less than 90° with each other.

7. An apparatus as claimed in claim 1, wherein all the capillary tubes of said pressure setting means have equal gas-dynamic resistance values and their geometric dimensions are determined by the relationship:

$$1/d^2 = P/16\mu\sqrt{MT_nP/2P_nT},$$

where d is the internal diameter of the capillary tubes;

1 is the length of the capillary tubes;

P is the density of the gas under normal conditions ($T_n=273.15°$ K.; $P_n=101325$ Pa);

$\mu$ is the viscosity of the gas at the gas temperature $T_n$;

P is the absolute pressure of the gas at the outlets from the capillary tubes; and m is the factor taking into consideration the terminal-induced effects at the capillary tube outlets.

* * * * *